US012316051B2

(12) United States Patent
Padmanabhan et al.

(10) Patent No.: US 12,316,051 B2
(45) Date of Patent: May 27, 2025

(54) INTEGRATED QUICK DISCONNECT CONNECTOR

(71) Applicant: SCHNEIDER ELECTRIC IT CORPORATION, Foxboro, MA (US)

(72) Inventors: Ashok Kumar Padmanabhan, Bangalore (IN); Mohan Narasaiah, Bangalore (IN); Sumandra Ghosh Chowdhury, Bangalore (IN); Rajeev Bammanni, Bangalore (IN)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 315 days.

(21) Appl. No.: 18/077,297

(22) Filed: Dec. 8, 2022

(65) Prior Publication Data

US 2023/0198210 A1 Jun. 22, 2023

(30) Foreign Application Priority Data

Dec. 22, 2021 (IN) ............................ 202111059967

(51) Int. Cl.

| | |
|---|---|
| ***H01R 13/703*** | (2006.01) |
| ***H01R 13/627*** | (2006.01) |
| ***H01R 13/633*** | (2006.01) |
| ***H01R 43/26*** | (2006.01) |

(52) U.S. Cl.

CPC ..... *H01R 13/7036* (2013.01); *H01R 13/6275* (2013.01); *H01R 13/633* (2013.01); *H01R 43/26* (2013.01)

(58) Field of Classification Search

CPC .............. H01R 13/7036; H01R 13/633; H01R 13/6275; H01R 13/6271; H01R 43/26

USPC .................................................. 439/188, 352

See application file for complete search history.

(56) References Cited

U.S. PATENT DOCUMENTS 3,980,370 A * 9/1976 Gonzalez-Hernandez .................. H01R 13/70 200/51.09
5,513,999 A * 5/1996 Fry .................... H01R 13/7035 439/378
5,997,323 A * 12/1999 Youn ..................... G06F 1/1632 439/157
6,227,895 B1 * 5/2001 McFarlane ............. H01R 24/84 439/352
9,923,302 B2 * 3/2018 Friesen .............. H01R 13/5202
10,283,908 B1 * 5/2019 Simmons ............. H01R 13/635
10,411,395 B1 * 9/2019 Wu ...................... H01R 13/506

(Continued)

FOREIGN PATENT DOCUMENTS

CN 110635304 B 4/2022
EP 0478236 A2 4/1992

OTHER PUBLICATIONS

Extended European Search Report from corresponding European Application No. 22214204.4 dated May 17, 2023.

*Primary Examiner* — Gary F Paumen
(74) *Attorney, Agent, or Firm* — Lando & Anastasi, LLP

(57) ABSTRACT

A cable connector includes a slide coupled to a spring to bias the slide from a retracted position to an extended position and at least one latch coupled to the slide. The slide, when in the extended position, is configured to rotate the at least one latch to secure the at least one latch, and when in the retracted position, is configured to rotate the at least one latch in an opposite direction to release the at least one latch. The slide is configured to engage a contact switch when securing the at least one latch.

25 Claims, 7 Drawing Sheets

(56) References Cited

U.S. PATENT DOCUMENTS

| | | | | |
|---|---|---|---|---|
| 10,955,487 | B2 * | 3/2021 | Hemnani ............. | H01R 13/701 |
| 2008/0280505 | A1 * | 11/2008 | Ma ....................... | H01R 13/502<br>439/372 |
| 2020/0292626 | A1 * | 9/2020 | Hemnani ............. | G01R 31/006 |

* cited by examiner

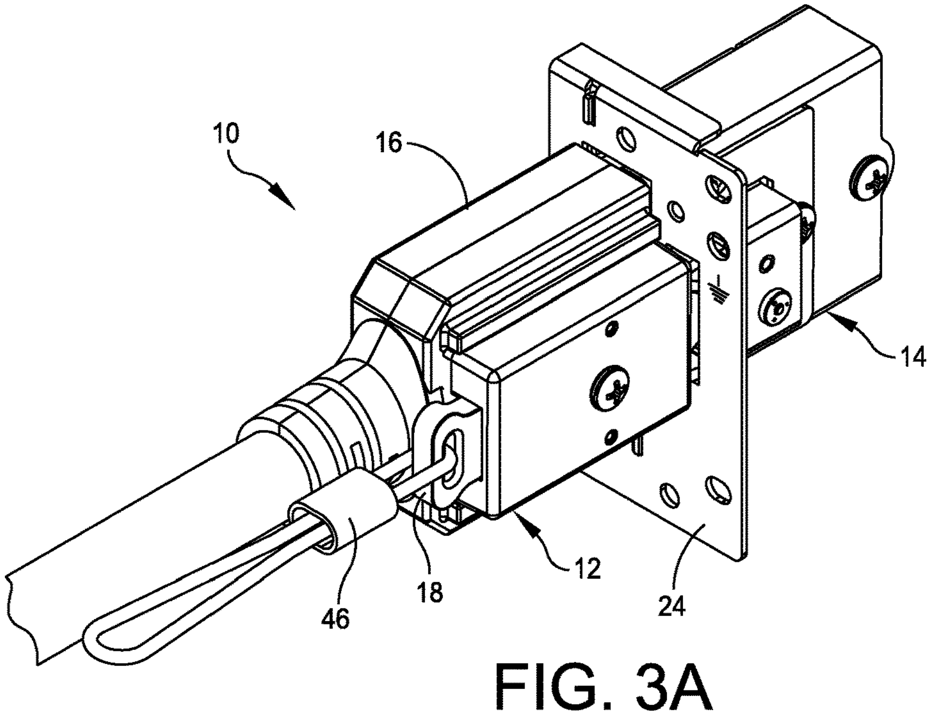
FIG. 3A
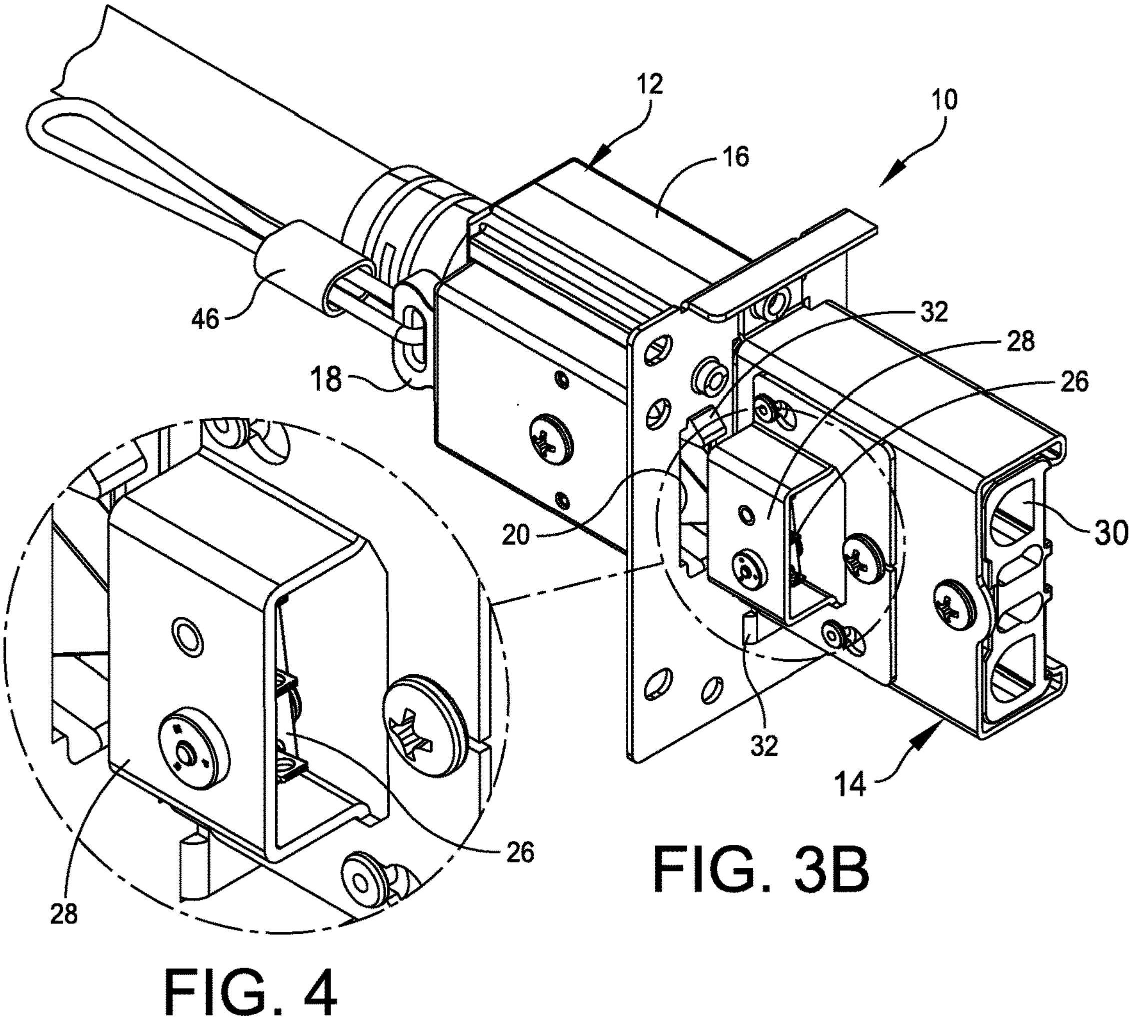
FIG. 3B
FIG. 4

INTEGRATED QUICK DISCONNECT CONNECTOR

CROSS-REFERENCE TO RELATED APPLICATION

This application claims the benefit under 35 U.S.C. § 119 of Indian Patent Application No. 202111059967, filed Dec. 22, 2021, and titled INTEGRATED QUICK DISCONNECT CONNECTOR, which is hereby incorporated herein by reference in its entirety for all purposes.

BACKGROUND OF THE DISCLOSURE

1. Field of Disclosure

The technical field relates generally to uninterruptible power supplies (UPSs), and more particularly, to an integrated quick disconnect connecter used to connect an external battery pack to a UPS.

2. Discussion of Related Art

Presently, cables that connect UPSs to external battery packs (XBPs) are connected to connectors provided on the UPS (UPS connectors). An exemplary cable and connector do not have a quick-disconnect mechanism to enable the cable and thus the XBP to be quickly disconnected from the UPS. The connector is typically screwed into the chassis of the UPS, thus taking time to connect and disconnect the cable and the XBP from the UPS.

Further, presently there is no mechanism associated with such cables and connectors to ensure there is no high voltage on UPS connectors during the connection and disconnection process. A user runs the risk of unwanted electrical discharge when connecting and disconnecting the cable used to connect the XBP to the UPS. Circuit breakers can be employed to protect the user, but circuit breakers take up space and provide additional cost.

As mentioned, many power devices, including UPSs, employ extra XBPs that are connected to the UPSs by connectors, such as Anderson connectors, to transfer power and signal from the UPSs to and from the XBPs to extend the run time of the UPSs. There are different types of power pole connectors that are used. These connectors are used at either a rear or a front side of the product so that they are easily accessible to the user to engage the connections. In addition, no other connector available in the market are configured to deliver max voltage (50 volts (V)) and current.

When using a number of XBPs that are connected to the UPS, disconnection of a circuit breaker device is also another concern, which will lead to additional wiring complexity. With existing connectors, a connector is secured to the chassis by using overmolded cables that are attached using screws. FIGS. 1A and 1B illustrate an example of an overmolded plug 5. A tool, such as a screwdriver, is required to install and remove a set screw to secure the cable thereby hindering the ability to provide a quick disconnect connector. To meet UL requirements, an additional device, such as a circuit breaker, may be needed to meet manual disconnect requirements. When a remote battery cabinet that is located away from the UPS, a circuit breaker is provided to protect the building wiring, in addition to protecting the person working on the UPS. When providing a full or complete rack, there is no building wiring involved so the rack should include a disconnect device to connect to the external battery. When the unit is under consideration for being serviced, and where a group of units having individual supply connections is interconnected in such a way that it is possible for hazardous voltage or energy levels are transmitted between units, a disconnect device may be provided to disconnect hazardous parts likely to be contacted.

Some challenges of this environment include using a typical screw to secure the connector in a conventional design, which makes the design restricted for service personnel only. In this instance, a manually operated switch or additional circuit breaker is required to meet manual disconnect requirements. One aspect is to make the disconnect safe by the user. To add circuit breakers, existing schemes may have restriction of space and cost limitation. To avoid disconnect device, these parts should be guarded and marked with appropriate warning labels.

In one industry standard, a manual disconnect is applicable, without a screw to secure the connector. A cover not requiring a tool to open the cover is required. One option is a thumb screw. If a thumb screw is used, the limitation of quarter turn is realized, which may not possible and may not be acceptable as manual disconnect is a key requirement. The connector should be interrupt rated, if the agency accepts the same as disconnecting device. Available connectors in the market, such as Anderson connectors, have been evaluated at 120 V as per UL 1977 or can be classified as a connector with breaking capacity (CBC) as per IEC 61984, which are specially designed to be engaged or disengaged in normal use when live or under load. The same connector will not meet interrupt requirement of higher voltage e.g., 180 V dc, as the connector does meet 250 cycle tests as per UL 1977 standard due to high energy associated during make or break. The same connector, which is not deemed to be engaged or disengaged in normal use when live or under load, is known as a connector without breaking capacity (COC). Thus, there is need for a CBC connector with interrupt rating as per application which is not available in the market for greater than 180 V.

Mechanical disconnect mechanisms can have challenge in meeting 250 cycles. The connector should be able to meet overload test and resistance to arc test for 250 cycles. The test is not applicable as in UL 1977 as the contact is interlocked with an integral switch. When a contact device is interlocked with an integral switch or other means, such as having the circuit opened before a mating contact is inserted or withdrawn, need not be subjected to this test. Thus, there is need of disconnection requirement mechanically and electrically. Interlocking the mechanical disconnect with electrical circuit so that circuit is opened when mating connector is inserted or withdrawn.

Additionally, lithium ion battery standard UL 1973 requires battery systems with hazardous voltage circuits, including outputs of 50 V or greater, shall be provided with a manual disconnect device or be provided with installation instructions for the disconnect device to be provided during installation of the system. The disconnect device should be located as near as possible to the battery system terminals and shall be rated for the application including disconnect under load. The manual disconnect shall not require the use of a special tool or equipment to be operated.

SUMMARY OF THE DISCLOSURE

One aspect of the present disclosure is directed to a quick disconnect connector assembly that includes a plug and a receptacle. The plug includes a plug body, a slide that is slidably received within a space formed in the plug body, and a connector that is secured to the plug body. The receptacle includes a plate, a contact switch housed within an enclosure that is secured to the plate, and a mating connector secured to the plate. The plug includes a pair of latches that are secured to the plug body and configured to be engaged by the slide as the slide moves laterally. The latches are configured to releasably engage the plate of the receptacle within an opening provided in the plate to secure plug to the receptacle. The top latch engages a top edge of the opening and the bottom latch engages a bottom edge of the opening. Each latch is pivotally secured to the plug body. The slide includes an end that engages the contact switch to position the contact switch in an ON position, which enables electrical connection between the connector and the mating connector. The plug includes at least one compression spring, which is coupled to the slide by an arm that extends through the center of the compression spring. The other end of the at least one compression spring engages a wall formed within the plug body. The at least one compression spring is configured to bias the slide to an extended position to enable the end of the slide to engage the contact switch. Concurrently, the slide is configured to move the latch to an outboard or engaged position in which latch members associated with the latch are moved away from one another to engage the inner side of the plate. The slide has a pull to enable an operator to move the slide away from the contact switch thereby disconnecting power between the connector and mating connector. The at least one compression spring is configured to rotate the latches toward the slide when the slide compresses the compression spring.

Another aspect of the present disclosure is directed to a cable connector comprising a slide coupled to a spring to bias the slide from a retracted position to an extended position and at least one latch coupled to the slide. The slide, when in the extended position, is configured to rotate the at least one latch to secure the at least one latch, and when in the retracted position, is configured to rotate the at least one latch in an opposite direction to release the at least one latch. The slide is configured to engage a contact switch when securing the at least one latch.

Embodiments of the cable connector further may include configuring the at least one latch to be secured to a plug and configuring the at least one latch to be engaged by the slide as the slide moves laterally with respect to the plug. The at least one latch may include a pair of latches each configured to releasably engage a plate of a receptacle within an opening provided in the plate to secure the plug to the receptacle. A top latch of the pair of latches may engage a top edge of the opening of the plate and a bottom latch of the pair of latches may engage a bottom edge of the opening of the plate. Each latch may be pivotally secured to the plug by a pin, with the top latch being configured to rotate about the pin and the bottom latch being configured to rotate in an opposite direction than the top latch when the slide is in the extended position to secure the top latch and the bottom latch. The slide may include an end that engages the contact switch to position the contact switch in an ON position, which enables electrical connection between a connector and a mating connector. The spring may be a compression spring, which is coupled to the slide. An end of the compression spring may engage a wall formed within a plug. The compression spring may be configured to bias the slide to the extended position to enable an end of the slide to engage the contact switch. The slide may be configured to move the at least one latch to an outboard or engaged position in which the at least one latch is moved to engage an inner side of a plate. The slide may be configured to rotate the at least one latch to an inboard or disengaged position when the slide compresses the spring when being moved to the retracted position. The slide may have a pull to enable an operator to move the slide to the retracted position away from the contact switch to disconnect power between a connector and a mating connector.

Yet another aspect of the present disclosure is directed to a connector assembly configured to connect and disconnect a connector from a mating connector. In one embodiment, the connector assembly comprises a plug including a plug body, a slide that is slidably coupled to the plug body, and a connector that is secured to the plug body and a receptacle including a plate, a mating connector secured to the plate, and a contact switch housed within an enclosure that is secured to the mating connector. The slide is configured to engage the contact switch when securing the connector to mating connector.

Embodiments of the connector assembly further may include at least one latch that is coupled to the plug body and configured to be engaged by the slide as the slide moves laterally. The at least one latch may include a pair of latches each configured to releasably engage the plate of the receptacle within an opening provided in the plate to secure plug to the receptacle. A top latch of the pair of latches may engage a top edge of the opening and the bottom latch of the pair of latches engages a bottom edge of the opening. Each latch may be pivotally secured to the plug body by a pin. The slide may be configured to be biased by a spring to an extended position to rotate the top latch and a bottom latch to secure the plug to the receptacle. The slide may be configured to move against the bias of the spring to a retracted position to rotate the top latch and the bottom latch in an opposite direction to release the plug from the receptacle. The slide may include an end that engages the contact switch to position the contact switch in an ON position, which enables electrical connection between the connector and the mating connector. The plug may include at least one compression spring, which is coupled to the slide. An end of the at least one compression spring may engage a wall formed within the plug body. The at least one compression spring may be configured to bias the slide to an extended position to enable an end of the slide to engage the contact switch. The slide has a pull to enable an operator to move the slide away from the contact switch to disconnecting power between the connector and the mating connector.

Another aspect of the present disclosure is directed to a method of connecting and disconnecting a connector and a mating connector. In one embodiment, the method comprises biasing a slide from a retracted position to an extended position. The slide, when in the extended position, is configured to rotate at least one latch to secure the at least one latch. The slide, when moved to the retracted position, is configured to rotate the at least one latch in an opposite direction to release the at least one latch. The slide further is configured to engage a contact switch when securing the at least one latch.

Embodiments of the method further may include a pair of latches each configured to releasably engage a plate of a receptacle within an opening provided in the plate to secure a plug to the receptacle. The method further may include engaging a top latch of the pair of latches with a top edge of the opening of the plate and engaging a bottom latch of the pair of latches with a bottom edge of the opening of the plate. The method further may include pivotally securing each latch to the plug by a pin, with the top latch being configured to rotate about the pin and the bottom latch being configured to rotate in an opposite direction than the top latch to secure the top latch and the bottom latch when the slide is the extended position. The method further may include engaging an end of the slide to the contact switch to position the contact switch in an ON position, which enables electrical connection between the connector and the mating connector.

Yet another aspect of the present disclosure is directed to a method of connecting and disconnecting a connector and a mating connector. In one embodiment, the method comprises: when inserting a connector associated with a plug into a mating connector associated with a receptacle, engaging a slide, which is coupled to the plug, with a contact switch that is housed within an enclosure coupled to the receptable; and releasably securing the plug to the receptacle.

Embodiments of the method further may include providing at least one latch that is coupled to the plug body and configured to be engaged by the slide as the slide moves laterally with respect to the plug body. The at least one latch may include a pair of latches each configured to releasably engage a plate of the receptacle within an opening provided in the plate to secure plug to the receptacle. Each latch may be pivotally secured to the plug by a pin. The method further may include biasing the slide toward the contact switch. Biasing the slide may include providing at least one spring, which is coupled to the slide. The at least one spring may be configured to bias the slide to an extended position to enable an end of the slide to engage the contact switch. The method further may include moving the slide away from the contact switch to disconnecting power between the connector and the mating connector.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 3A and 3B are isometric views of the integrated quick disconnect connector assembly shown in FIGS. 2A and 2B with the plug of the connector assembly received within the receptacle of the connector assembly to achieve an engaged position;

FIG. 4 is an enlarged isometric view of a portion of the receptacle of the connector assembly;

DETAILED DESCRIPTION OF THE DISCLOSURE

Figure 1A:
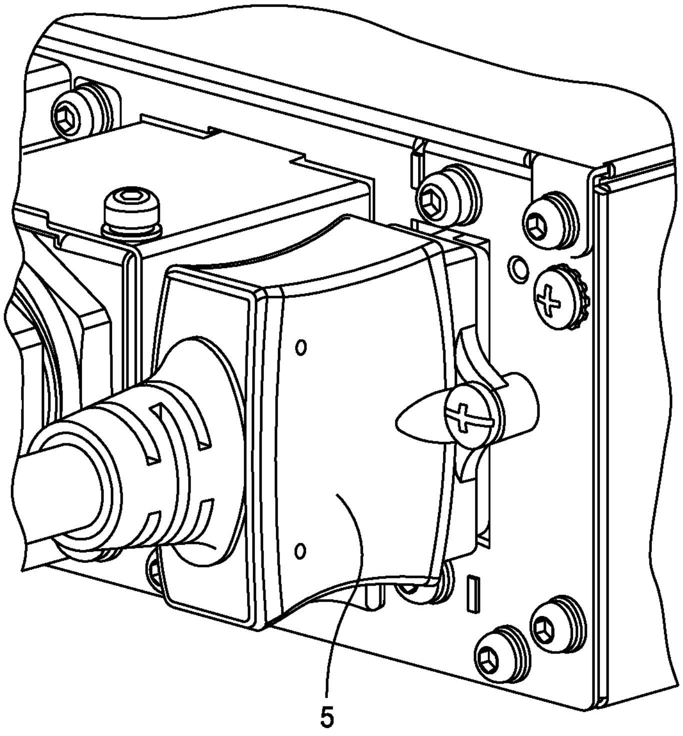
FIGS. 1A and 1B are isometric views of an existing overmolded connector.
Figure 1B:
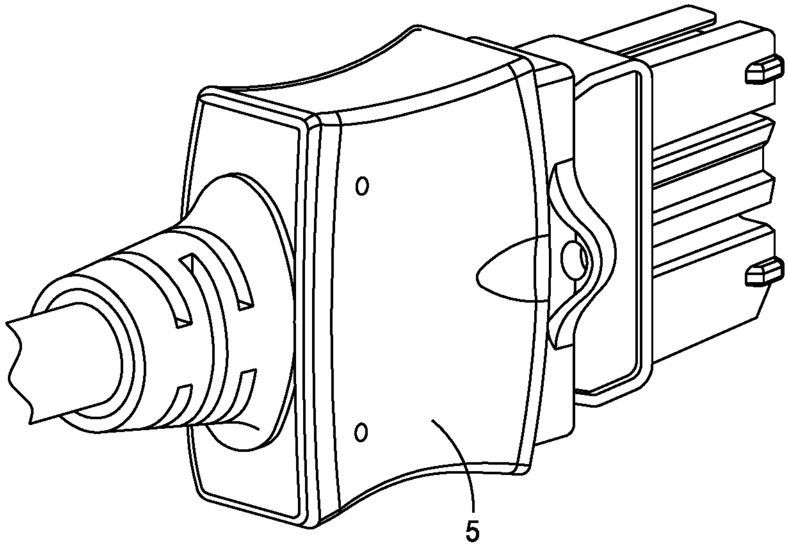
Figure 2A:
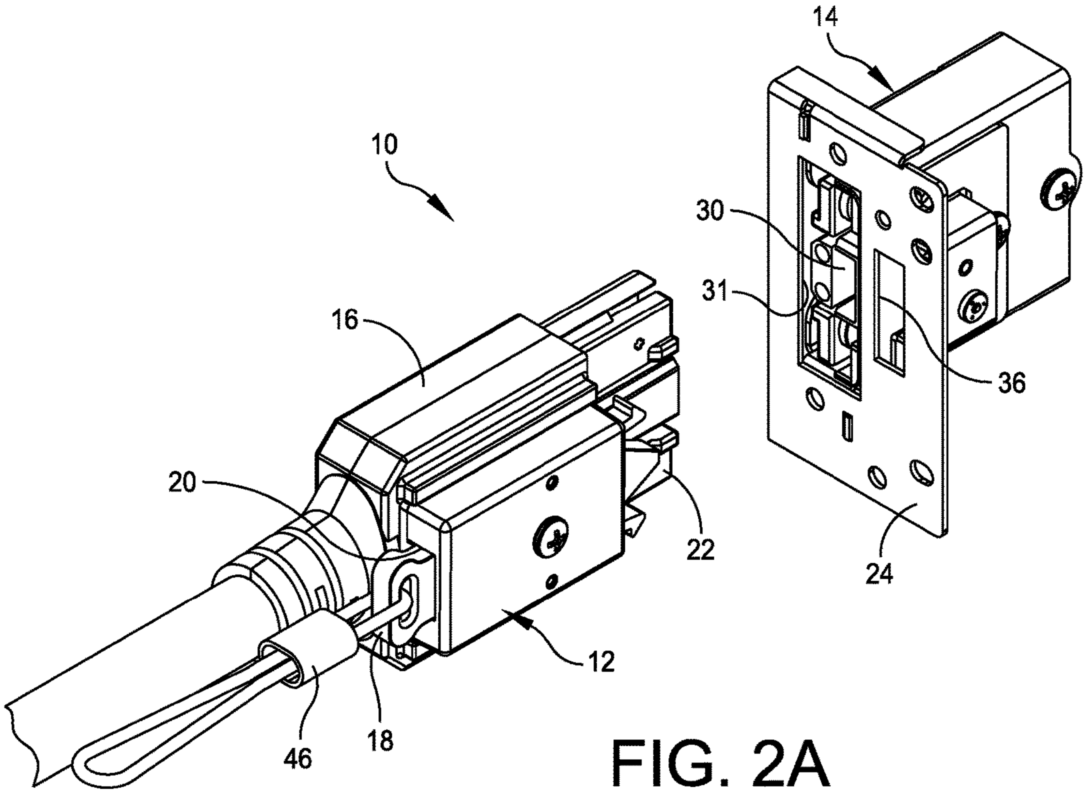
FIGS. 2A and 2B are isometric views of an integrated quick disconnect connector assembly of an embodiment of the present disclosure with a plug of the connector assembly spaced from a receptacle of the connector assembly in a disengaged position.
Figure 2B:
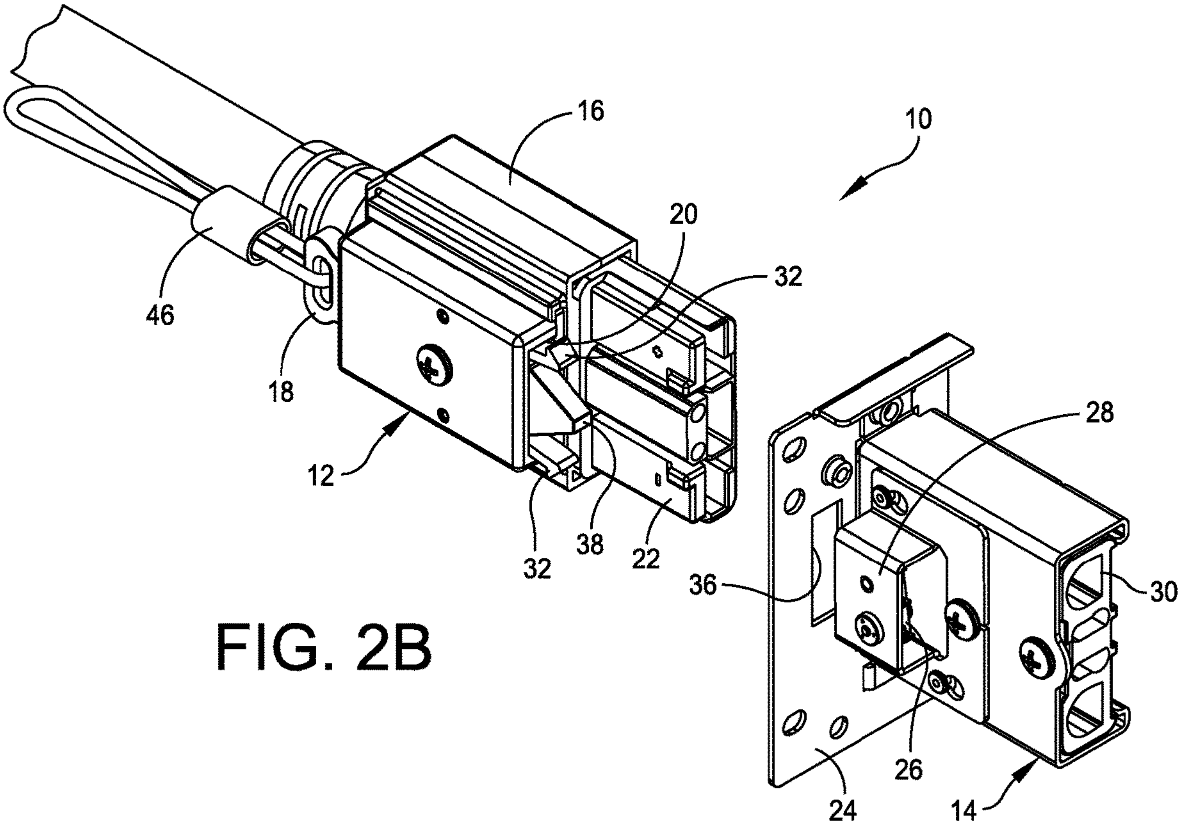

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for description purposes and should not be regarded as limiting. The use of "including," "comprising," "having," "containing," "involving," and variations herein, are meant to be open-ended, i.e. "including but not limited to."

Embodiments of an integrated quick disconnect connector for external lithium ion battery connection include a connector that is designed to meet standard requirement, such as a SBS75-type connector provided by Anderson Power Products. The disconnect connector is configured to break the voltage or current at the terminals of connector prior to disconnecting the disconnect connector. As described above, prior to the disconnect connector disclosed herein, breaking the voltage was achieved by using circuit breakers in series to battery voltage supply connection. This is readily available solution, but circuit breakers are bulky in size and need a space inside the unit or external battery packs.

The disconnect connector disclosed herein addresses all the above needs described above. Specifically, the disconnect connector avoids usage of bulky and huge circuit breakers in the system. The integrated connector provides a safe disconnect by the user. The integrated switch provided in the disconnect connector meets requirements of existing power switches or circuit breakers with optimized cost and no additional space. The quick disconnect mechanism can be provided as an add-on to an Anderson connector to achieve voltage breaking with minimum interrupt current without use of any tool.

In some embodiments, power connection occurs when the cable is inserted into a mating Anderson connector and at the same time cable should be retained in locked position.

In some embodiments, the need to either guard or mark the connector with warning labels is eliminated. Further, the need to have thumbscrews is eliminated.

Referring now to the drawings, and more particularly to FIGS. 2A, 2B, 3A, 3B, 4, 5A, 5B, 6A and 6B, a quick disconnect connector assembly is generally indicated at 10. As shown, the connector 10 includes a plug generally indicated at 12 and a receptacle generally indicated at 14. The plug 12 includes a plug body 16, a slide 18 that is slidably received within a space 20 formed in a side of the plug body 16, and a connector 22 that is secured to the plug body 16.

The receptacle 14 includes a plate 24, a contact switch 26 housed within an enclosure 28, and a mating connector 30 secured to the plate 24. As shown, the enclosure 28 is secured to the mating connector 30 on a side of the mating connector by screw fasteners. In one embodiment, the connector 22 and the mating connector 30 includes a SBS75-type connector and mating connector. However, as noted below, the quick disconnect assembly 10 can be used with a variety of connectors used for power connections. As shown, when connected, the connector 22 is configured to enter an enlarged opening 31 formed in the plate to be received within the mating connector 30.

The plug 12 includes a pair of latches, each indicated at 32, that are secured to the plug body 16. As shown, each latch 32 is secured to the plug body 16 by a pin 34 that enables the latch to rotate or pivot with respect to the pin body. The latches 32 are configured to be engaged by the slide 18 as the slide moves laterally within the space 20. The latches 32 are configured to releasably engage the plate 24 of the receptacle 14 within an opening 36 provided in the plate 24 to secure plug 12 to the receptacle 14. As shown, the top latch 32 engages a top edge of the opening 36 of the plate 24 and the bottom latch 32 engages a bottom edge of the opening 36 of the plate 24. In this position, each latch 32 engages the plate 24 to secure the latch against the plate, with the slide 18 providing a force against each latch since the slide is biased to an extended position, which will be described in greater detail below.

FIGS. 3A and 3B illustrate the plug 12 received within the receptacle 14, with the connector 22 received within the mating connector 30 and the slide 18 engaging the contact switch 26, which will be described in greater detail below. FIG. 4 illustrates an enlarged view of the enclosure 28, with the slide 18 extending into the enclosure to engage the contact switch 26.

Figure 5A:
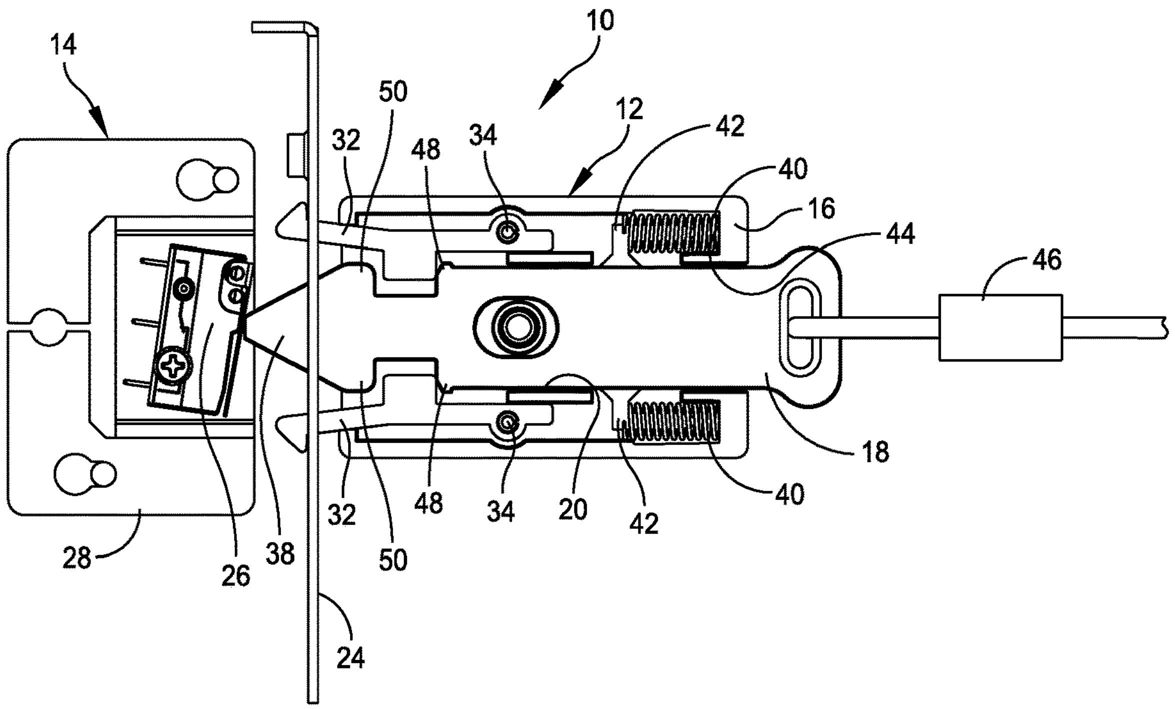
FIG. 5A is a side view of the connector assembly in the engaged position with portions removed to show components of the connector assembly.
Figure 5B:
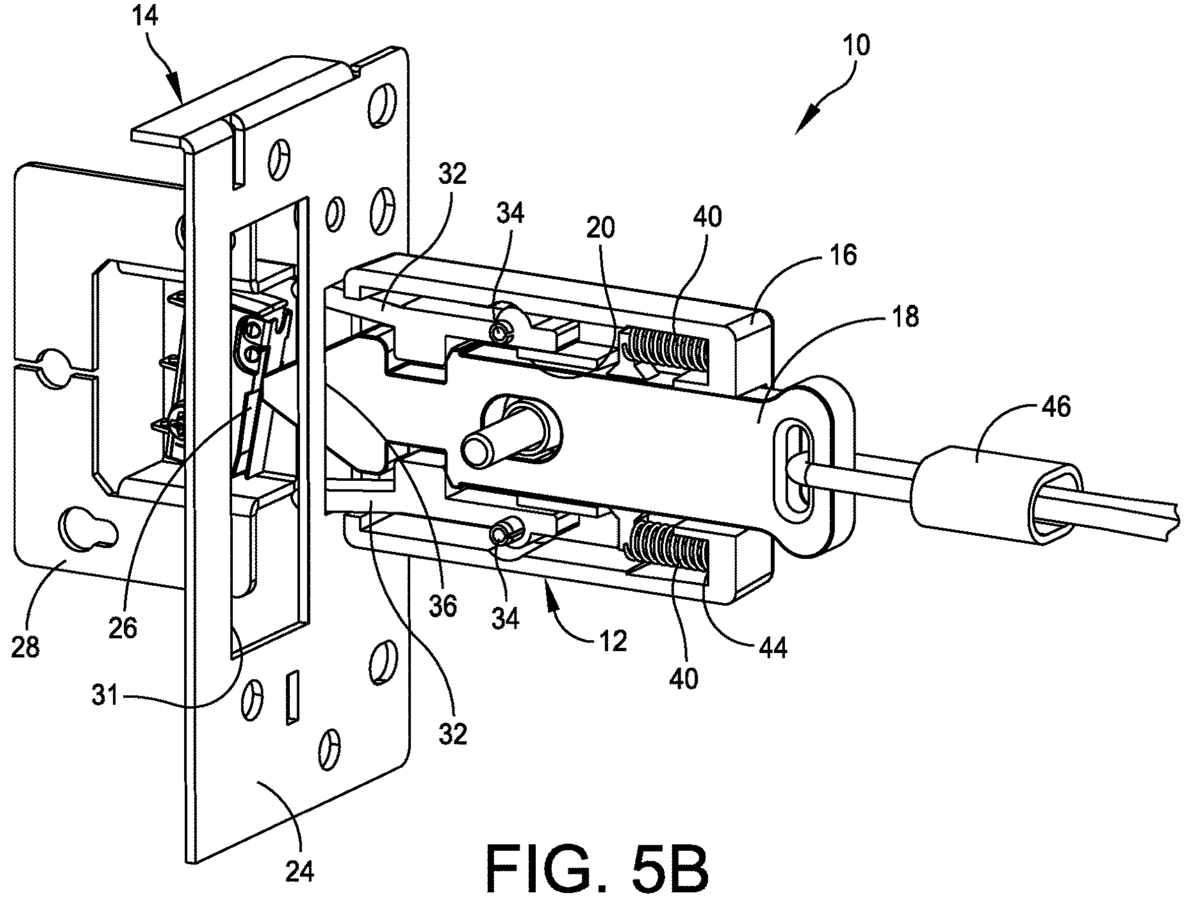
FIG. 5B is a isometric view of the connector assembly in the engaged position with portions removed to show components of the connector assembly.

Referring to FIGS. 5A and 5B, the plug 12 is secured to the receptacle 14, with the latches 32 secured to the plate 24 of the receptacle. As shown, the slide 18 includes an end 38 that engages the contact switch 26 to position the contact switch in an ON position. This in turn enables electrical connection between the connector 22 and the mating connector 30. Thus, it should be observed that the connector 22 and mating connector 30 cannot provide power from a device, e.g., a battery, to the UPS. As shown, the plug 12 include a pair of compression springs, each indicated at 40. Each compression spring 40 is coupled to the slide 18 by an arm 42 that extends through the center of the compression spring. The other end of each compression spring 40 engages a wall 44 formed within the plug body 16.

The compression springs 40 bias the slide 18 to the extended position to enable the end 38 of the slide to engage the contact switch 26 when securing the connector 22 to the mating connector 30. The slide 18 is configured to move the latches 32 to an outboard or engaged position in which latch members associated with the plug 12 are moved away from one another to engage the inner side of the plate 24. In this position, the latches 32 are secured to the plate 24 in that the latches prevent the plug 12 from being removed from the receptacle 14. The slide 18 has a pull 46 to enable an operator to move the slide 18 away from the contact switch 26 against the bias of the springs 40 thereby disconnecting power between the connector 22 and mating connector 30.

Figure 6A:
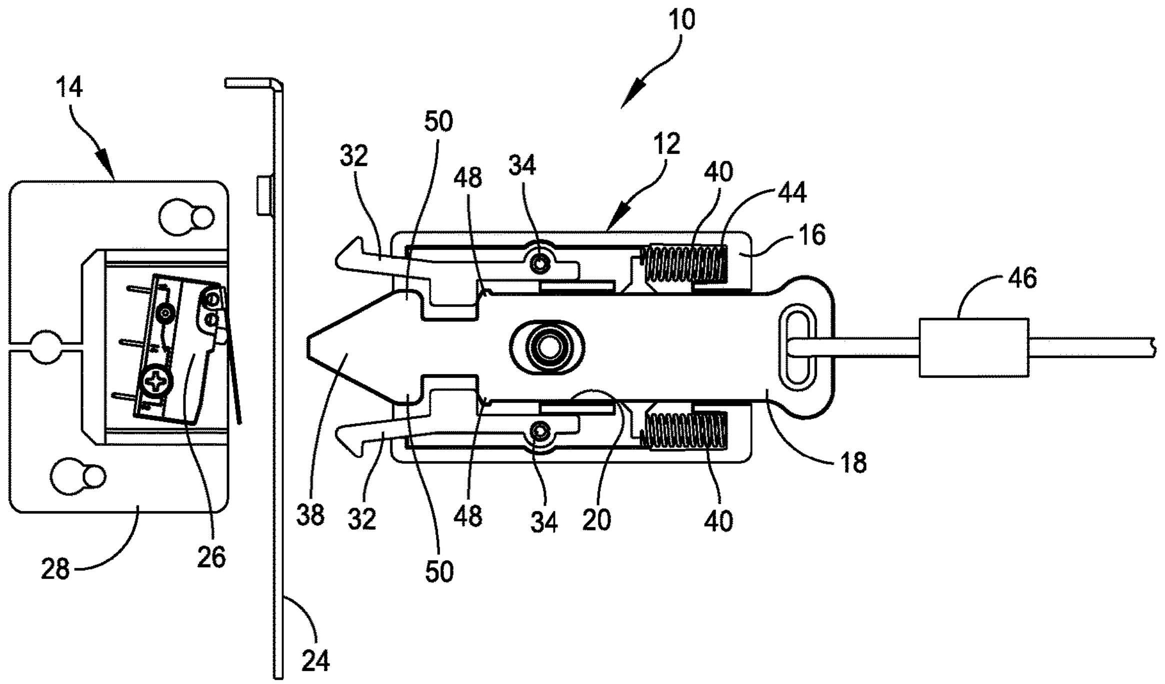
FIG. 6A is a side view of the connector assembly in the disengaged position with portions removed to show components of the connector assembly.
Figure 6B:
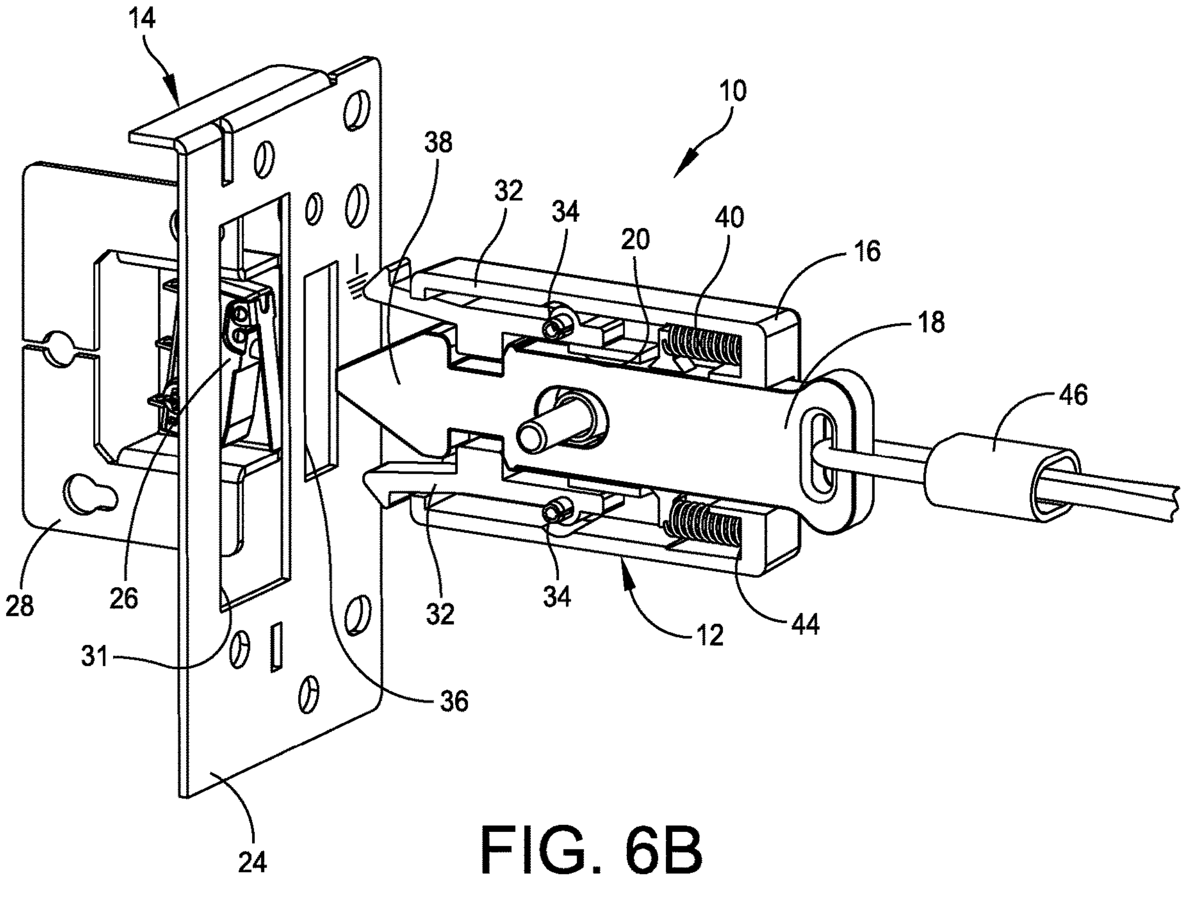
FIG. 6B is a isometric view of the connector assembly in the disengaged position with portions removed to show components of the connector assembly.
Figure 7:
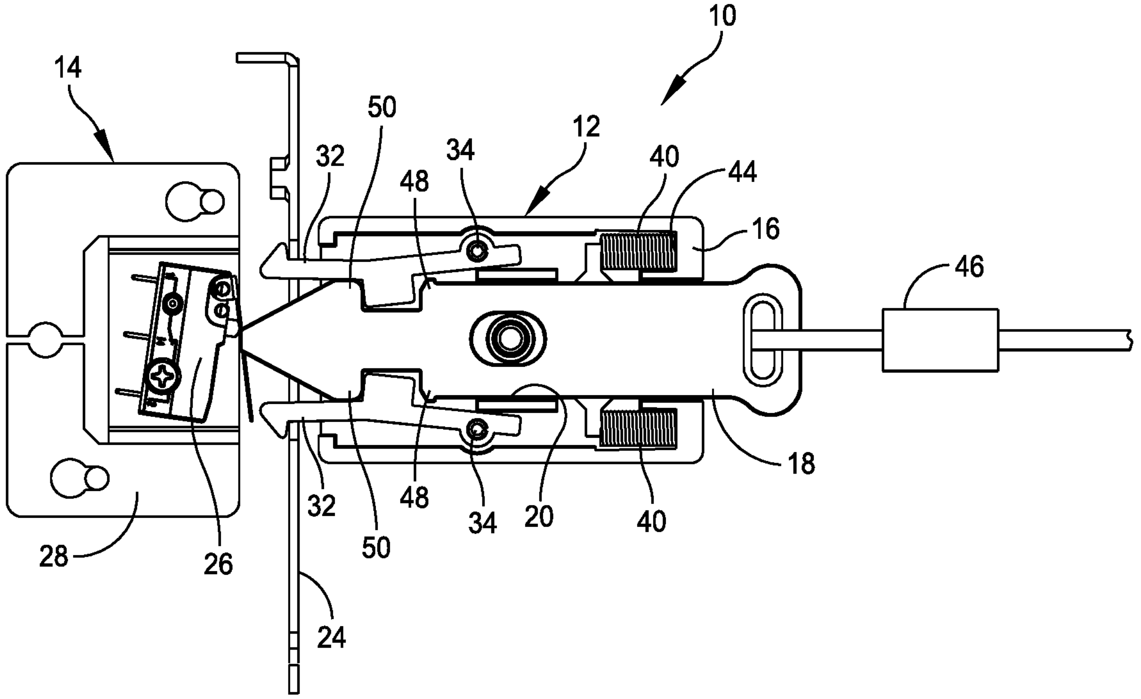
FIG. 7 is a side view of the connector assembly being disengaged from a contact switch with portions removed to show components of the connector assembly.

Referring to FIGS. 6A and 6B, and to FIG. 7, the slide 18 is shown to be pulled against the bias of the springs 40 so that the end 38 of the slide disengages the contact switch 26. As shown in FIG. 7, when an operator grasps the pull 46 to move the slide against the bias of the springs 40, the slide is configured to move the latches 32 inboard so that the latches disengage the plate 24 of the receptacle 14 to enable the plug 12 to be disconnected from the receptacle. In this position, the connector 22 of the plug 12 is able to disconnect the mating connector 30 of the receptacle 14 to fully remove the plug from the receptacle. FIGS. 6A and 6B show the plug 12 completely removed from the receptacle 14 with the slide 18 being moved to its biased extended position by the springs 40. In this position, the slide is configured to move the latches 32 outboard.

Thus, the operation of the disconnect connector assembly 10 is as follows. During installation, an operator manipulates the plug 12 so that when the plug approaches the receptacle 14 with the connector 22 aligned with the mating connector 30 and the slide 18 aligned with the enclosure 28 that houses the contact switch 26. The operator then inserts the connector 22 into the mating connector 30. Simultaneously, the end 38 of the slide 18 enters the opening of the plate 24 so that the end is proximate with the contact switch 26. Only when the connector 22 is fully received within the mating connector 30 can the end 38 of the slide 18 engage the contact switch 28 to provide power between the connector and mating connector and thus the XBP to the UPS.

During removal, the operator grasps the pull 46, e.g., a tether, provided on an opposite end of the slide 18 to move the slide within the space 20 against the bias of the compression springs 40. This movement causes the end of the slide 18 to disengage the contact switch 26 to disconnect power between the connector 22 and the mating connector 30. This movement further causes the latches 32 to be moved inboard with respect to one another so that the connector 22 can be removed from the mating connector 30 in a safe, efficient manner.

Referring FIG. 6A, when the slide 18 is in the extended position under the bias of the springs 40, portions of the slide, each indicated at 48, engage respective latches 32 to rotate the latches about their respective pins 34 in an outboard direction. Specifically, in the shown embodiment, the top latch 32 is rotated clockwise and the bottom latch 32 is rotated counterclockwise. Referring to FIG. 7, when the slide 18 is moved against the bias of the springs 40 by pulling the pull 46, portions of the slide, each indicated at 50, engage respective latches 32 to rotate the latches about their respective pins 34 in an inboard position. Specifically, in the shown embodiment, the top latch 32 is rotated counterclockwise and the bottom latch 32 is rotated clockwise.

Figure 8A:
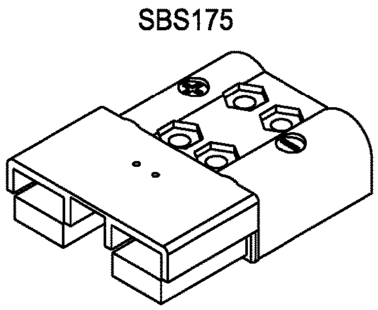
FIGS. 8A-8C are isometric views of connectors that may be used with the connector assembly of the present disclosure.
Figure 8B:
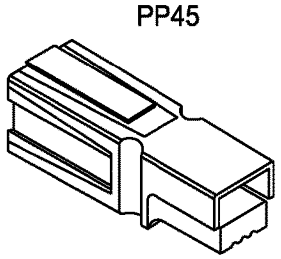
Figure 8C:
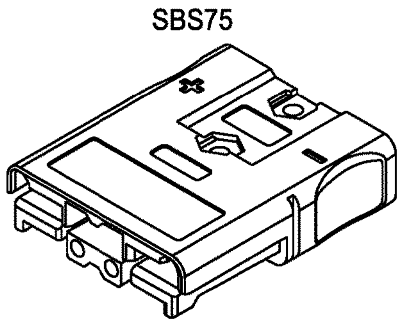

FIGS. 8A-8C illustrate connectors on which the plug and receptacle of the present disclosure can be applied. As shown, the quick disconnect connector can be used with an SBS175-type connector (FIG. 8A), a PP45-type connector (FIG. 8B), and an SBS75-type connector (FIG. 8C).

Figure 9:
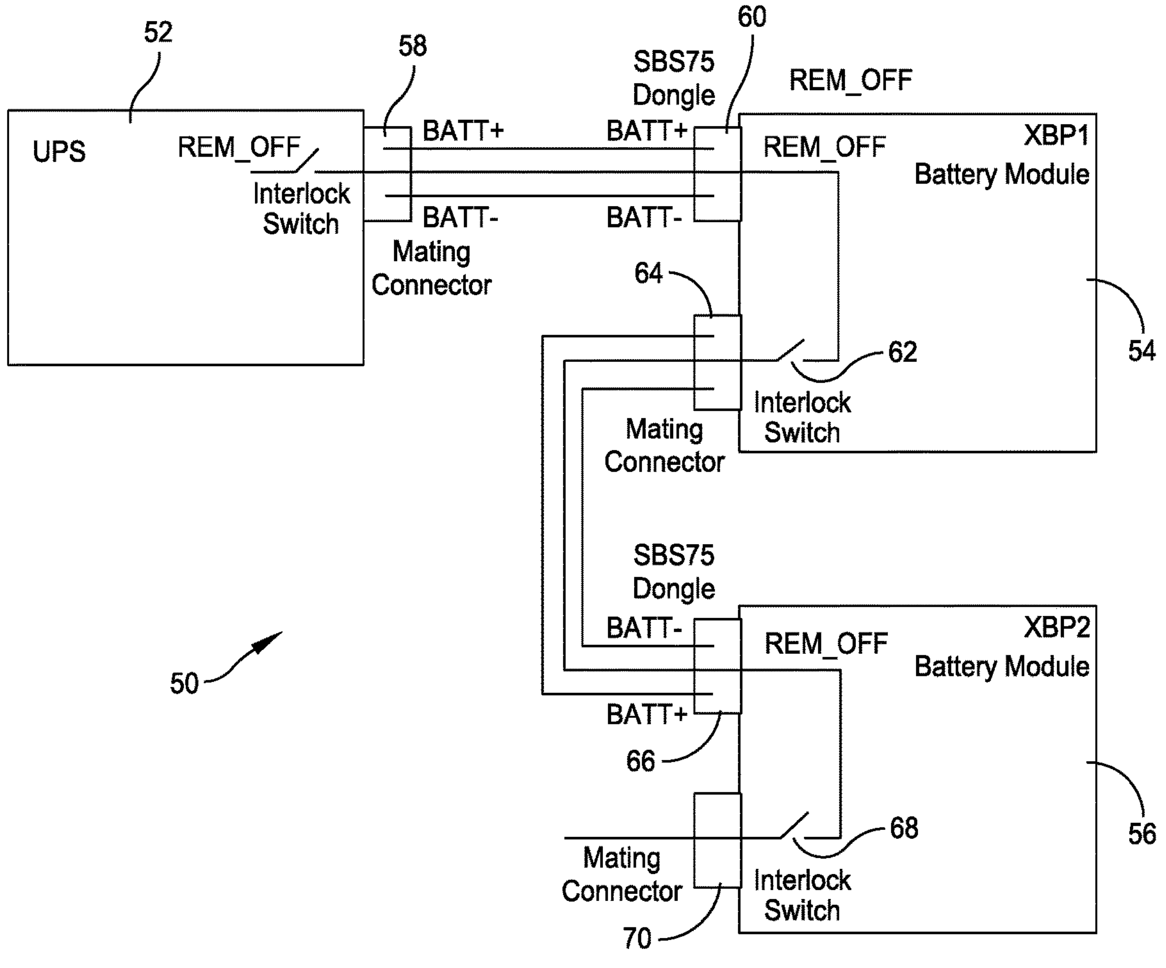
FIG. 9 is a block diagram of the electrical connections between a UPS and XBPs.

Referring to FIG. 9, an electrical schematic of the UPS and XBPs is generally indicated at 50. As shown, there is a UPS 52 and two XBP battery modules 54, 56. A mating connector 58 of the UPS 52 is connected to a connector 60 of the XBP battery module 54. An interlock switch 62 is provided between the connector 60 and a mating connector 64 of the XBP battery module 54. The mating connector 64 of the XBP battery module 54 is connected to a connector 66 of the XBP battery module 56. As with XBP battery module 54, the XBP battery module 56 includes an interlock switch 68 provided between the connector 66 and a mating connector 70.

For the XBP battery module 54 (XBP1) to operate normally, REM_OFF should be connected to a battery return (RTN). During the disconnect operation, REM_OFF is first disconnected from RTN using an interlock switch, which turns off the power supply for the battery module. At this point, VBATT and IBATT return to zero. Subsequently, the plug is removed from the receptacle to complete the disconnect operation.

The functionality and benefits associated with the quick disconnect connector of embodiments of the present disclosure are as follows:

- Couple with manually connect/disconnect requirement of UPS standard.
- Eliminate circuit breaker and hence lowers costs.
- Eliminate restriction of service only and makes it user safe.
- Supports non-availability of connector with interrupt rating greater than 180 volts (V).
- Lowers or reduces space.
- Eliminates the need for special tools.
- Improves design by eliminating thumb screws of prior designs.
- Provides higher reliability by an integrated interlock.
- Provides additional resistance to arc test.
- Meets component standard requirement.
- Supports lithium ion battery UL 1973 manual disconnect requirement.
- Acts as a power switch.

In some embodiments, a quick disconnect connector has an enhanced rating from a “COC rated connector” to a “Connector with Breaking Capacity” by meeting interrupt requirement at higher application voltage to eliminate restriction of non-availability which would have forced to use circuit breakers thereby leading to cost escalation and increased space requirements.

In some embodiments, a quick disconnect connector is configured to perform a lengthy reliability test as per UL 1977, and is exempted as there is integral switch to connect and disconnect the connector.

In some embodiments, a quick disconnect connector complies with mechanical construction requirement of standard UL 1973 Clause 7.8.1.4. Manual disconnect connectors do not require the use of a special tool.

Overall, user safe disconnect scheme complies with the requirement of lithium ion enabled UPS standard UL 1778 as well as component requirement of UL 1973 for battery and connector requirement of UL 1977 and IEC 61984.

In some embodiments, a tool-less quick connect/disconnect mechanism is employed.

In some embodiments, connector engagement/disengagement, locking/unlocking, and connector energize/de-energize happens at the same time with just one push or pull, respectively, of the slide.

In some embodiments, the quick disconnect connector can be deployed in products where there are space constraints.

In some embodiments, the quick disconnect connector has a unique connect/disconnect mechanism to ensure customer safety for lithium ion-enabled UPSs.

In some embodiments, the quick disconnect connector provides a comprehensive system to manage conflicts between UPS and lithium ion battery standards with respect to manual disconnect mechanisms.

In some embodiments, the quick disconnect connector eliminates lengthy reliability testing during product design cycle leading to better time to market.

In some embodiments, the quick disconnect connector eliminates the need for multiple circuit breakers in the extended battery connected systems leading to optimal cost reduction.

In some embodiments, the quick disconnect connector is configured to release latches by pulling a tether.

In some embodiments, the quick disconnect connector, when the cable engages the connector, the ALU latch deflects against the rear panel cut and becomes locked, which secures the whole cable assembly.

In some embodiments, the quick disconnect connector meets industry standards, including clause 3.4.101(c) of Standard UL 1778-5th edition.

In some embodiments, the quick disconnect connector can be provided to be accessible and easily operated in case of service or emergency.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A cable connector comprising:

a slide coupled to a spring to bias the slide from a retracted position to an extended position; and at least one latch coupled to the slide, wherein the slide, when in the extended position, is configured to rotate the at least one latch to secure the at least one latch, and when in the retracted position, is configured to rotate the at least one latch in an opposite direction to release the at least one latch, wherein the slide is configured to engage a contact switch when securing the at least one latch, and wherein the spring is a compression spring, which is coupled to the slide, an end of the compression spring engaging a wall formed within a plug.

2. The cable connector of claim 1, wherein the at least one latch is configured to be secured to a plug and configured to be engaged by the slide as the slide moves laterally with respect to the plug.

3. The cable connector of claim 2, wherein the at least one latch includes a pair of latches each configured to releasably engage a plate of a receptacle within an opening provided in the plate to secure the plug to the receptacle.

4. The cable connector of claim 3, wherein a top latch of the pair of latches engages a top edge of the opening of the plate and a bottom latch of the pair of latches engages a bottom edge of the opening of the plate.

5. The cable assembly of claim 3, wherein each latch is pivotally secured to the plug by a pin, the top latch being configured to rotate about the pin and the bottom latch being configured to rotate in an opposite direction than the top latch when the slide is in the extended position to secure the top latch and the bottom latch.

6. The cable connector of claim 1, wherein the slide includes an end that engages the contact switch to position the contact switch in an ON position, which enables electrical connection between a connector and a mating connector.

7. The cable connector of claim 1, wherein the slide has a pull to enable an operator to move the slide to the retracted position away from the contact switch to disconnect power between a connector and a mating connector.

8. A cable connector comprising:

a slide coupled to a spring to bias the slide from a retracted position to an extended position; and at least one latch coupled to the slide, wherein the slide, when in the extended position, is configured to rotate the at least one latch to secure the at least one latch, and when in the retracted position, is configured to rotate the at least one latch in an opposite direction to release the at least one latch, wherein the slide is configured to engage a contact switch when securing the at least one latch, and wherein the spring is a compression spring, which is coupled to the slide, the compression spring being configured to bias the slide to the extended position to enable an end of the slide to engage the contact switch.

9. The cable connector of claim 8, wherein the slide is configured to move the at least one latch to an outboard or engaged position in which the at least one latch is moved to engage an inner side of a plate.

10. The cable connector of claim 9, wherein the slide is configured to rotate the at least one latch to an inboard or disengaged position when the slide compresses the spring when being moved to the retracted position.

11. A connector assembly configured to connect and disconnect a connector from a mating connector, the connector assembly comprising:

a plug including a plug body, a slide that is slidably coupled to the plug body, and a connector that is secured to the plug body; and a receptacle including a plate, a mating connector secured to the plate, and a contact switch housed within an enclosure that is secured to the mating connector, wherein the slide is configured to engage the contact switch when securing the connector to the mating connector.

12. The connector assembly of claim 11, wherein the plug further includes at least one latch that is coupled to the plug body and configured to be engaged by the slide as the slide moves laterally.

13. The connector assembly of claim 12, wherein the at least one latch includes a pair of latches each configured to releasably engage the plate of the receptacle within an opening provided in the plate to secure plug to the receptacle.

14. The connector assembly of claim 13, wherein a top latch of the pair of latches engages a top edge of the opening and the bottom latch of the pair of latches engages a bottom edge of the opening.

15. The connector assembly of claim 14, wherein each latch is pivotally secured to the plug body by a pin.

16. The connector assembly of claim 15, wherein the slide is configured to be biased by a spring to an extended position to rotate the top latch and a bottom latch to secure the plug to the receptacle.

17. The connector assembly of claim 15, wherein the slide is configured to move against the bias of the spring to a retracted position to rotate the top latch and the bottom latch in an opposite direction to release the plug from the receptacle.

18. The connector assembly of claim 11, wherein the slide includes an end that engages the contact switch to position the contact switch in an ON position, which enables electrical connection between the connector and the mating connector.

19. The connector assembly of claim 11, wherein the plug includes at least one compression spring, which is coupled to the slide, an end of the at least one compression spring engaging a wall formed within the plug body.

20. The connector assembly of claim 11, wherein the plug includes at least one compression spring, which is coupled to the slide, the at least one compression spring being configured to bias the slide to an extended position to enable an end of the slide to engage the contact switch.

21. The connector assembly of claim 11, wherein the slide has a pull to enable an operator to move the slide away from the contact switch to disconnecting power between the connector and the mating connector.

22. A method of connecting and disconnecting a connector and a mating connector, the method comprising:

biasing a slide from a retracted position to an extended position, wherein the slide, when in the extended position, is configured to rotate at least one latch to secure the at least one latch, wherein the slide, when moved to the retracted position, is configured to rotate the at least one latch in an opposite direction to release the at least one latch, and wherein the slide is configured to engage a contact switch when securing the at least one latch to position the contact switch in an ON position, which enables electrical connection between the connector and the mating connector.

23. The method of claim 22, wherein the at least one latch includes a pair of latches each configured to releasably engage a plate of a receptacle within an opening provided in the plate to secure a plug to the receptacle, the method further comprising engaging a top latch of the pair of latches with a top edge of the opening of the plate and engaging a bottom latch of the pair of latches with a bottom edge of the opening of the plate.

24. A method of connecting and disconnecting a connector and a mating connector, the method comprising:

when inserting a connector associated with a plug into a mating connector associated with a receptacle, engaging a slide, which is coupled to the plug, with a contact switch that is housed within an enclosure coupled to the receptacle; and releasably securing the plug to the receptacle.

25. The method of claim 24, further comprising biasing the slide toward the contact switch.

* * * * *